Oct. 27, 1970 J. R. WINEGARD ETAL 3,537,036

DIRECTIONAL LINE DROP TAP UNIT

Filed Nov. 6, 1968 3 Sheets-Sheet 1

Inventors
John R. Winegard
Gary L. McCollum
By Keith J. Kulie and Donald B. Southard
Attorneys Oct. 27, 1970 J. R. WINEGARD ET AL 3,537,036

DIRECTIONAL LINE DROP TAP UNIT

Filed Nov. 6, 1968 3 Sheets-Sheet 2

Inventors
John R. Winegard
Gary L. McCollum
By Keith J. Kulie and Donald B. Southard
Attorneys Inventors
John R. Winegard
Gary L. McCollum
By Keith J. Kulie and Donald B. Southard
Attorneys

United States Patent Office 3,537,036

Patented Oct. 27, 1970

3,537,036

DIRECTIONAL LINE DROP TAP UNIT

John R. Winegard and Gary L. McCollum, both of 3000 Kirkwood St., Burlington, Iowa 52601

Filed Nov. 6, 1968, Ser. No. 773,839

Int. Cl. H03h *7/48, 7/52*

U.S. Cl. 333—10 5 Claims

ABSTRACT OF THE DISCLOSURE

A subminiaturized 82-channel directional line drop tap or coupler unit suitable for selectively coupling a portion of signal energy transmitted down a main distribution or trunk line to a television receiver. The drop tap unit includes a miniaturized one-turn ferrite core transformer enabling broad frequency response encompassing the entire television frequency band together with associated circuitry which effects a cancellation of signals reflected back up the main trunk line to provide at least 40 db of isolation in the reverse direction. Substantally precise impedance match is achieved in both the forward, or thru the coupler unit, as well as the reverse, or backward, direction.

The present invention relates to coupler devices for selectively coupling one or more television receiver sets into a main distribution line and in particular to an improved line drop tap or coupler unit suitable for coverage of the entire television band from channel 2 to 83 and which exhibits highly directional characteristics so as to prevent any signal energy reflected back along the distribution line from reaching the associated television receivers. Exceptionally close impedance matching is achieved in both the forward as well as the rearward directions.

In large buildings, such as modern day urban apartment complexes, for example, it is unpractical, if not objectionable, to incorporate separate television antennas for each television receiver operative within the building. Hence, it has become common practice to erect a master antenna television (MATV) system whereby signals from a common or master television antenna are fed to a plurality of television antennas via a main transmission distribution or trunk line. Suitable coupling devices of one sort or another are thus required to couple in the receiver sets to the main trunk line.

Television coupler units are of course known in the art. A number of such prior art devices exist which are intended to couple signals from a main trunk line to television sets within the VHF television range (channels 2 through 13, inclusive). However, with the advent of the UHF television channels (channels 14 through 83) in recent years, coverage of only the VHF range is no longer appropriate, nor indeed acceptable. Capability of coverage of both the VHF and UHF bands is a necessity if obsolescence of the MATV system as a whole is to be avoided.

Still another problem, and one which is all too frequently encountered in MATV systems, is signals being reflected back up the distribution line which, upon reaching the television receiver set, causes "ghosts" and/or "smears." The ideal condition, of course, would be for the signals traveling down the distribution line in the forward direction to be effectively and completely absorbed by the various receiver sets acting as the line load through their individual coupler units. However, this is not possible from a practical standpoint. An alternative, then, is to have the associated coupler devices exhibit a sharply directional characteristic. That is, having the coupler unit readily couple signals from the distribution line to the television receiver set as the signals travel down the line in the forward direction from the master TV antenna to the terminal end of the distribution line but to effectively prevent any such signals reflected back along the line from reaching the individual receiver sets.

While a few prior art coupler units are said to possess some directional characteristics of one sort or another, the extent of the directional capability is far more imagined than real. Moreover, all such prior art devices exhibit various other serious operational deficiencies in one aspect or another. The majority of such prior art devices said to possess directional characteristics simply incorporate attenuation circuitry to reduce the level of signals coupled therethrough. It affects both the forward traveling signals and the reflected signals in essentially the same manner. Still other prior coupler devices, for example, may incorporate "bridging" circuitry to obtain a somewhat better directional performance characteristic. However, such devices are acutely frequency sensitive and are in no way capable of covering the entire VHF-UHF band. In still other devices, it has been found that the coupler devices load the main distribution line unduly, thereby resulting in a high loss and consequent unequal signal to the various television sets. Additionally, it can be said that most of the coupler devices in the prior art exhibit less than an acceptable impedance match from the distribution line through the coupler unit and/or from the television set back through the coupler unit to the distribution line.

Accordingly, it is a general object of the present invention to provide an improved line drop tap or coupler unit for use in a television master distribution system which exhibits extremely sharp directional operational characteristics without substantial loading of the distribution line.

A more particular object of the present invention is to provide an improved directional line drop tap or coupler unit providing substantially uniform operation across the entire television range from channel 2 to 83, inclusive.

Another and more particular object of the present invention is to provide a directional coupler unit of the foregoing type which exhibits extremely sharp directional characteristics in that signals reflected back up the main trunk line are blocked with a high degree of isolation and prevented from reaching the associated television receiver sets coupled to the line.

Still another object of the present invention is to provide a directional coupler unit of the foregoing type wherein the highly directional characteristics are achieved by a unique combination of circuitry operative to effect a cancellation of signals reflected back up the main distribution line at a reference point within the coupler unit.

Yet another object of the present invention is to provide a directional coupler unit of the foregoing type wherein a substantially precise impedance match is achieved for the main distribution line through the coupler unit so as to accommodate any length of trunk line without deleterious effect as well as any number of coupler units connected to such distribution line.

It is another object of the present invention to provide a directional coupler tap unit of the foregoing type wherein substantially a precise impedance match is obtained between the associated television receiver set back through the coupler unit to further eliminate the possibility of ghosts or smears occurring in the set as a result of signal reflections.

Another and more particular object of the present invention is the provision of a directional coupler unit having features of construction, arrangement and cooperation of parts that make it readily manufactured, inexpensive, compact in size, yet highly effecient in operation and commercially attractive.

The novel features which are believed to be characteristic of the invention are set forth with particularity in the appended claims. The invention itself, however, both as to its organization and as to further objects and advantages thereof will best be understood from the following description taken in conjunction with the accompanying drawings, in which:

Figure 1:
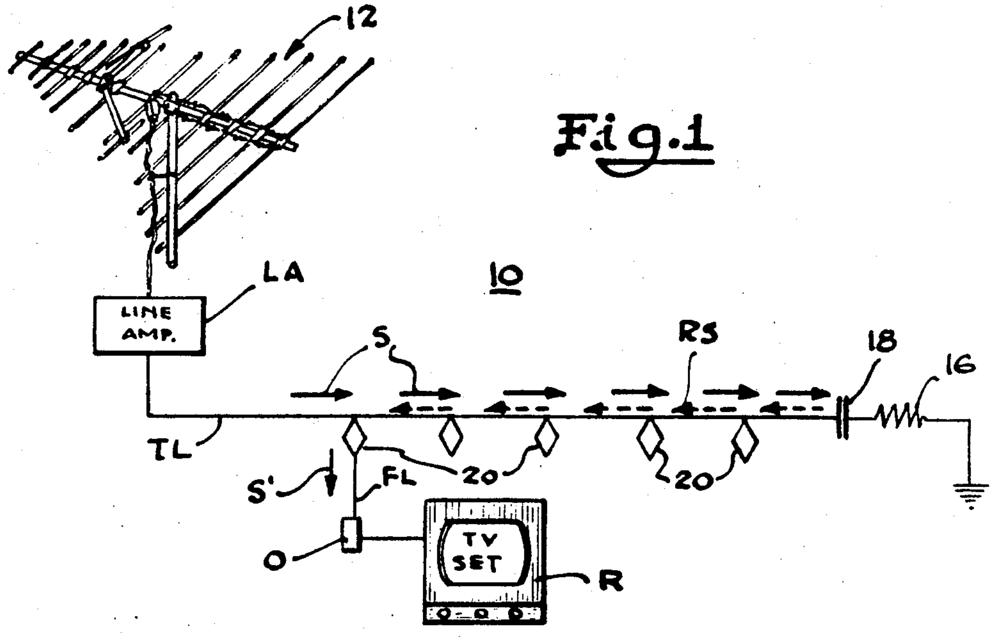
FIG. 1 is a digrammatic representation of a MATV distribution system in which the directional coupler units embodying the present invention are employed.
Figure 2:
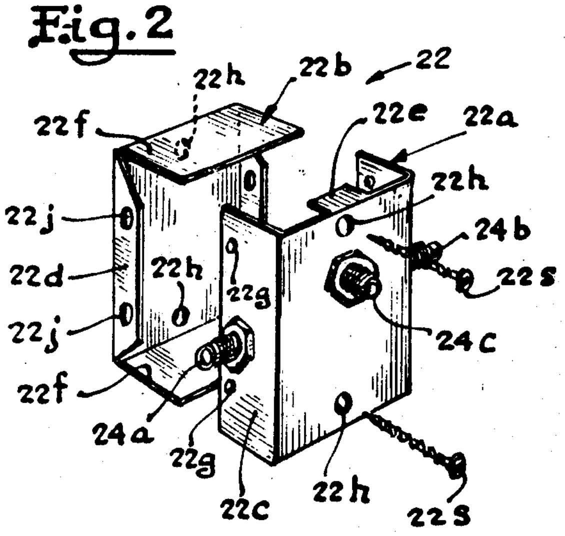
FIG. 2 is a perspective view in side elevation of the directional coupler unit employed in the distribution system of FIG. 1.
Figure 3:
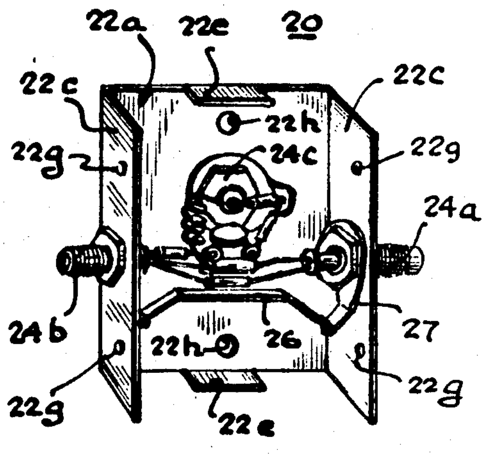
FIG. 3 is a perspective view of the directional coupler unit of FIG. 2 illustrating the placement of the associated circuitry therein.
Figure 7A:
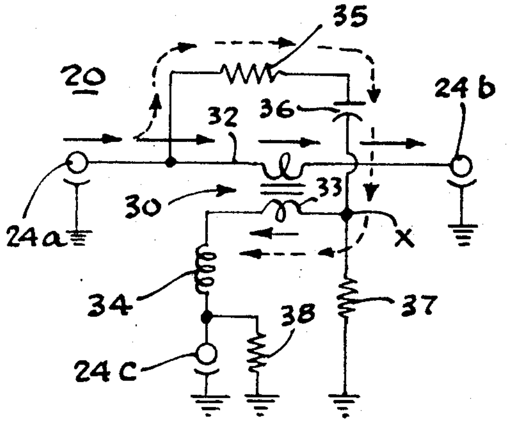

FIG. 7*a* is a partial schematic diagram of the directional coupler unit of FIGS. 2 and 3 useful in describing the coupling of signals thru the unit.

Figure 7B:
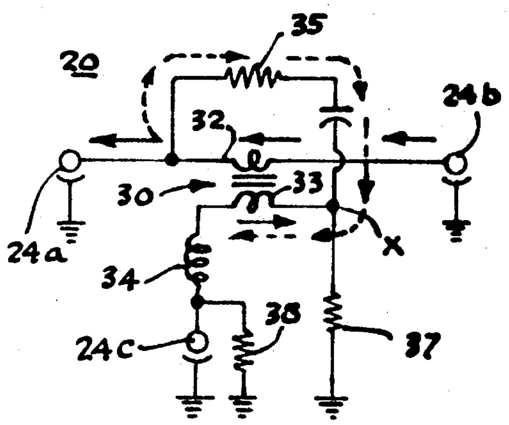
Figure 8:
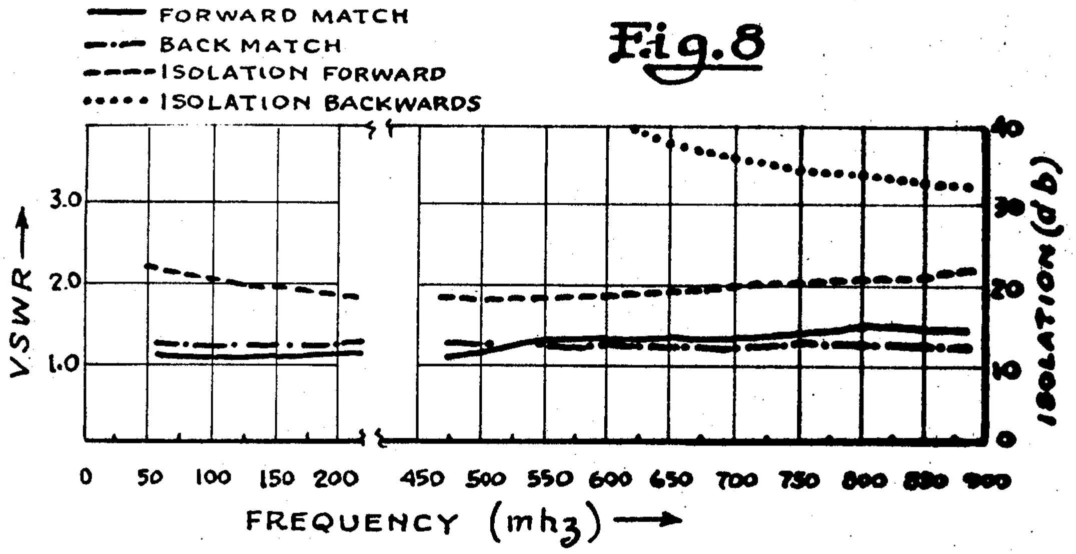

FIG. 7*b* is a partial schematic diagram of the directional coupler unit of FIGS. 2 and 3 useful in understanding the cancellation of such signals reflected up the distribution line; and FIG. 8 is a graphic representation of the voltage standing wave ratio and isolation between the coupler unit and distribution line in both the forward and reverse direction along such line which may be obtained when incorporating coupler units in accordance with the present invention.

Referring now to the drawings, a master antenna television (MATV) system 10 is illustrated wherein directional line drop tap or coupler units are employed which have been constructed in accordance with the present invention. The MATV system 10 includes a master television antenna 12 from which signals developed thereby are fed to a line amplifier unit LA and from there down a main transmission distribution or trunk line TL. The trunk line TL is terminated at its remote end by a resistance 16 approximating the characteristic impedance of the trunk line TL. A D-C blocking capacitor 18 may also be incorporated in the line if desired.

A plurality of television receiver sets R may be coupled to the main trunk line TL at selected locations therealong. At each location, the television set is coupled to the main trunk line TL through an outlet box O having a feeder line FL connected to a directional coupler unit 20 which in turn is connected into the trunk line TL. Signals traveling down the main trunk line are indicated at S; signals coupled from the main line TL through the coupler units 20 to the receiver sets R as indicated as S'; and signals reflected back up the main line TL are indicated by the dashed arrows RS.

It will be understood that the foregoing system will inherently exhibit some degree of directional characteristics. That is, with the trunk line TL terminated in its norinal characteristic impedance, the signal flow is more prounounced in one direction than the other. More signal energy is transmitted down the line S than reflected signal energy RS is transmitted back up the line. At the selected locations, signal energy S' is tapped off thru the drop tap units 20 and coupled to the associated television receivers. Such an arrangement will customarily provide some 6 db of isolation between the coupler and the trunk line. However, from a practical standpoint, this has been found to be inadequate for optimum operation, particularly for reflected signal energy RS back up the line which results in ghosts and smears developing in the television receivers. Moreover, this 6 db isolation is the most that can be obtained—that is, with impedance ma and other parameters being maintained at their optimum value. In practice, the isolation obtained is less than this, and thus presents a substantial loading effect on the main trunk line and the attendant disadvantages thereto.

With directional coupler units in accordance with the present invention, isolation in the forward direction between a coupler unit 20 and main trunk line TL is on the order of 20 db. In the reverse direction, isolation with respect to the reflected signals RS traveling back up the main trunk line is on the order of 40 db or greater, or more than twice that of the forward direction. The result is the virtual elimination of ghosts and smears arising because of reflected signal energy reaching the individual television receiver sets which is slightly out of phase with the main signal coming off the line in the forward direction. Moreover, with the 20 db isolation in the forward direction, the main trunk line is not unduly loaded down such that there is no limitation from a practical standpoint as to the length thereof that may be employed nor to the number of directional coupler units that may be connected into the distribution line of the MATV system.

The coupler unit 20 shown in FIGS. 2 and 3 has been constructed in accordance with the present invention and represents one embodiment thereof. In this configuration, a line input and a line output are provided from the main trunk line connection and one tap-off point for connection to a television receiver R thru an associated outlet box O. Of course, if preferred, the connection may be made directly to the television receiver from the coupler unit 20.

The coupler unit 20 includes a housing 22 comprised of a base portion **22*a* and a cover portion 22*b*. In the preferred form, a coaxial connector jack 24*a* is provided for the line input from the main trunk line TL and a connector jack 24*b* for the output side of the line TL. A similar connector jack 24*c* is provided for connection to the outlet O, or directly to the television receiver R, if the outlet O is eliminated. The base and cover portions 22*a* and 22*b* form a frictional press fit therebetween. The upstanding sides 22*c* of the cover portion 22*a* overlap similar upstanding side walls 22*d* of the base 22*b*. Ears 22*e* extending laterally backward from the top and bottom edge of the cover portion 22*a* also frictionally overlap a portion of top and bottom walls 22*f* of the base portion 22*b*. The cover and base portions 22*a* and 22*b* are maintained in the interlocked position by a plurality of indentations or dimples 22*g* extending inwardly along the side walls 22*c* of the cover portion 22*a* which engage complementary openings 22*j* in the side walls 22*d* of the base portion 22*b*. The drop tap unit 20 may be secured in any convenient location by a pair of screws 22*s* or the like passing through clearance holes 22*h* provided in the cover and base portions 22*a* and 22*b*** as illustrated.

The circuitry of the coupler unit 20 is mounted on the underside of the cover portion **22*a* which serves as a chassis, best seen in FIG. 3. The individual components are connected between the inner conductors of the coaxial jacks 24*a*, 24*b* and 24*c* and a reference point, or ground. A flat metal strip 26 is connected between grounding lugs 27 maintained in electrical continuity to the side walls 22*c* by the mounting of the coaxial jacks 24*a* and 24*b*. The metal strip 26 is positioned in close proximity to center of the circuit components of the coupler unit 20**, the significance of which will be discussed subsequently.

Figure 4:
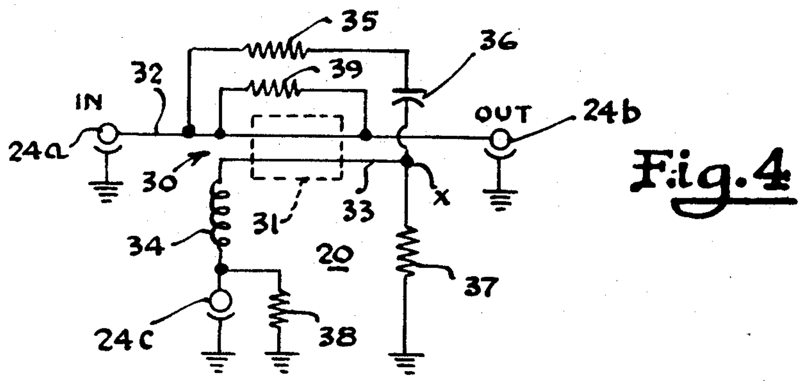
FIG. 4 is a schematic diagram of the circuitry for the directional coupler unit of FIGS. 2 and 3 for coupling one television receiver set to the main distribution line.

The schematic diagram of the circuitry for coupler unit 20 is illustrated in FIG. 4. As shown a ferrite core transformer 30 is connected between the input connector jack **24*a* and the output connector jack 24*b*. The transformer 30 consists of a single wire conductor 32** passing through a tubular core member 31 to ferrite material and which conductor serves as the primary of the transformer 30. A single wire conductor 33 likewise passes through the ferrite core 31 and serves as the transformer secondary. It will be understood then that transformer 30 is a one-turn transformer having one-to-one turn ratio. An inductance 34 is connected from one terminal of the transformer secondary 33 to the inner conductor of the receiver connector jack 24*c*. A resistance 35 and capacitance 36 are serially connected between the input side of the transformer primary 32 and the other side of the secondary 33 as shown. The junction of the capacitance 36 and the secondary 33 forms a reference terminal X. A terminating resistance 37 is connected between reference terminal X and ground. Another resistance 38 is connected in shunt with the connector jack 24*c* between its inner conductor and ground. Still another resistance 39 is connected in shunt with the primary 32 of the transformer 30.

In operation, signal energy present at the input coaxial jack 24*a* is conducted through the primary 32 of the transformer 30 to the output coaxial jack 24*b*. A portion of the signal energy is diverted through the transformer 30 and by appropriate transformer action, appears in the secondary 33 thereof. The signal energy is then coupled through the inductance 34 to the coaxial jack 24*c* for transfer to the associated television receiver. At the same time, another portion of the signal energy is shunted through resistor 35 and capacitor 36 around to the reference terminal X at one side of the secondary 33 of the transformer 30, best seen in FIG. 7*a*.

As will be readily understood, the signal energy coupled through the transformer 30 is subject to a 180 degree change in phase by virtue of transformer action. If the signal energy traveling down the main trunk line TL in the forward direction is indicated by the solid arrows pointing toward the right when viewing FIG. 7*a*, then the signal energy appearing in the secondary 33 may be represented by the solid arrow pointing toward the left, thereby indicating a 180 degree change in phase. At the same time, the portion of signal energy coupled through resistor 35 and capacitor 36 to reference terminal X is not subjected to any substantial degree phase change and thus is essentially in phase with the signal energy coupled through the transformer 30. Accordingly, there is a reinforcement of signal energy, as indicated.

However, the same signal reinforcement does not occur when the signal energy is traveling back or reflected up the main trunk line TL, as will be understood by reference to FIG. 7*b*. In this instance, there is an effective cancellation of signal energy within the secondary 33 of the transformer 30. Signal energy traveling back up the line TL is represented by the solid arrows to the left in FIG. 7*b*. A portion of the signal energy is coupled through the transformer 30 by transformer action to the secondary 33. The signals present in the secondary 33 of the transformer 30 are of course subjected to a 180 degree change of phase and are indicated by the solid arrow pointing to the right in FIG. 7*b*. At the same time, a portion of the signal energy reflected back up the main trunk line TL is shunted around through the resistor 35 and capacitor 36 to the reference terminal X. In this instance, however, the signal energy arrives directly out of phase with the signal energy coupled through the transformer 30. Accordingly the result is an effective cancellation of signals appearing at reference terminal X rather than a reinforcement of signal energy as indicated in FIG. 7*a* where the signals are traveling down the main distribution line in the forward direction.

As mentioned previously, the cancellation of signals at reference terminal X produces a high degree of isolation between the reflected signals traveling back up the line and the individual television receivers. On the average, some 40 db of isolation is effected in the coupler units embodying the present invention. FIG. 8 is a graphic illustration of the isolation in both the forward and backward directions that may be obtained from the coupler unit 20 as well as the voltage standing wave ratio indicative of the impedance match through the coupler unit in the forward direction and also backwards from the receiver set. Up to approximately 600 mHz., it will be observed that the isolation maintained with respect to reflected signals in the backward direction is in excess of 40 db, while, on the average, some 20 db of isolation is maintained between the coupler unit 20 and the distribution line TL in the forward direction.

The 20 db isolation in the forward direction is obtained essentially by the construction of the ferrite core transformer 30 and the shunt resistance 39. As previously described, the transformer is a one-turn transformer. That is, it includes a wire conductor 32 passing through the ferrite core 31 and forming a single turn for the primary thereof and a similar wire conductor 33 forming a single turn for the secondary. As such, it is effective to couple a small portion of the signal energy present on the main trunk line TL to the associated television receiver R. It will be understood that most of the signal energy is transferred to the output connector jack 24*b* through the wire conductor 32 or around through the shunt resistance 39. With this arrangement, approximately 20 db of isolation is obtained between the line drop tap unit 20 and the main trunk line TL, as shown in the graphic illustration of FIG. 8. With the substantial isolation as described in the forward direction, there is little, if any, loading of the distribution main trunk line TL, and thus no significant limitation as to length of the trunk line that may be accommodated. It further permits substantially any number of coupler units 20 to be used in the MATV system 10 as well.

It will also be understood that resistor 39 serves to ensure that the signal energy transmitted down the main trunk line in the forward direction is not subject to any significant degree of phase change. With transformer 30 operative to transfer but a small portion of the signal energy to the associated television receiver most of the signal energy is transmitted to connector jack 24*b* through resistor 39. There is of course no change of phase through a pure resistance and thus the majority of signal energy is the same phase at both the input signal connector jack 24*a* and at the output signal connector jack 24*b*.

In addition to coupling signal energy from the distribution line to the individual television receivers, another factor in obtaining efficient and effective operation is to ensure that substantially a precise impedance match in both the forward direction (through the coupler unit) and also backward from the television receiver. A mismatch in the forward direction causes discontinuities in the transference of signal energy down the line and severely restricts the length of the line that can be incorporated. Substantial mismatch in the backward direction from the television receiver gives rise to reflections between the receiver and coupler unit, thereby resulting in ghosts and smears developing in the receiver.

In the forward direction, a substantially precise impedance match is obtained by the conductor 32 serving as the primary of the transformer 30 and the metallic strip 26 located in close proximity thereto, best seen in FIG. 3. In this configuration, conductor 32 in combination with the strip 26 serve as a conventional open-wire transmission line. Metallic strip 26 is maintained at a reference, or ground, potential. The characteristic impedance of the conductor 32—strip 26 combination functioning as a transmission line is determined by the spacing between the conductor 32 and strip 26 and the diameter of the conductor 32 according to the known mathematical relationship of $Z_0=276 \log b/a$, where $b$ is the center-to-center distance between conductors and $a$ is the radius of the conductors (in the same units as $b$). By appropriate selection of the spacing between conductor 32 and the strip 26, the characteristic impedance thereof may be made to match the characteristic impedance of the particular coax cable employed for the main trunk line TL, thereby eliminating any discontinuities that would otherwise be presented to signal energy transmitted down the line.

In the backward direction, that is, looking backward from the terminals of the television receiver into the coupler unit 20, the proper impedance match is obtained by terminating resistors 37 and 38. Resistor 38 is on the order of 100 ohms and is connected from the inner conductor of the connector jack 24*c* to ground. Resistor 37 is on the order of 150 ohms and is connected from the reference terminal X to ground, and therefore in parallel with resistor 38. Resistors 37 and 38 thus effectively terminate the coax cable used as the feeder line FL by an impedance corresponding to the characteristic impedance of the line FL.

The VSWR obtained in the forward, or through the drop tap unit, and in the backward direction through the resistors 37 and 38 is shown in the graphic representation of FIG. 8. The values ploted in FIG. 8 are those obtained from tests of the coupler unit 20 as described above. It will be seen that the VSWR in the forward direction is between 1.05:1 at 50 mHz. and 1.4:1 at 890 mHz. A 1:1 ratio of course would be a perfect match. In practice, however, any VSWR up to a 2:1 value is considered excellent. For the backward direction, the VSWR is seen to be a flat 1.25:1 across the entire television frequency range of 50 mHz. to 890 mHz. (channels 2 through 83).

Insertion loss for the coupler unit 20 was observed to be approximately —0.75 db at 50 mHz., which increased slightly with frequency to a value of approximately −1.75 db at the high end of the frequency range, or 890 mHz.

It might also be mentioned that the inductance 34 serves a compensating function so as to ensure a uniform response of the coupler unit 20 across the entire frequency range of operation. As the frequency is increased, it will be understood that the efficiency of the transformer 30 increases, and thus more signal energy is coupled to the associated television receiver. To render this response more uniform, the inductance 34 is inserted in series with the secondary 33 of transformer 30 so that as the frequency of operation increases, a higher impedance is offered by inductance 34 to offset the increase in the efficiency of transformer 30. It has been found that approximately six turns of enameled wire on an air core of approximately 3/16 inches provides the desired degree of compensation in the coupler unit 20 as described to effect an essentially uniform response across the frequency range from approximately 50 mHz. to 1000 mHz.

Figure 6:
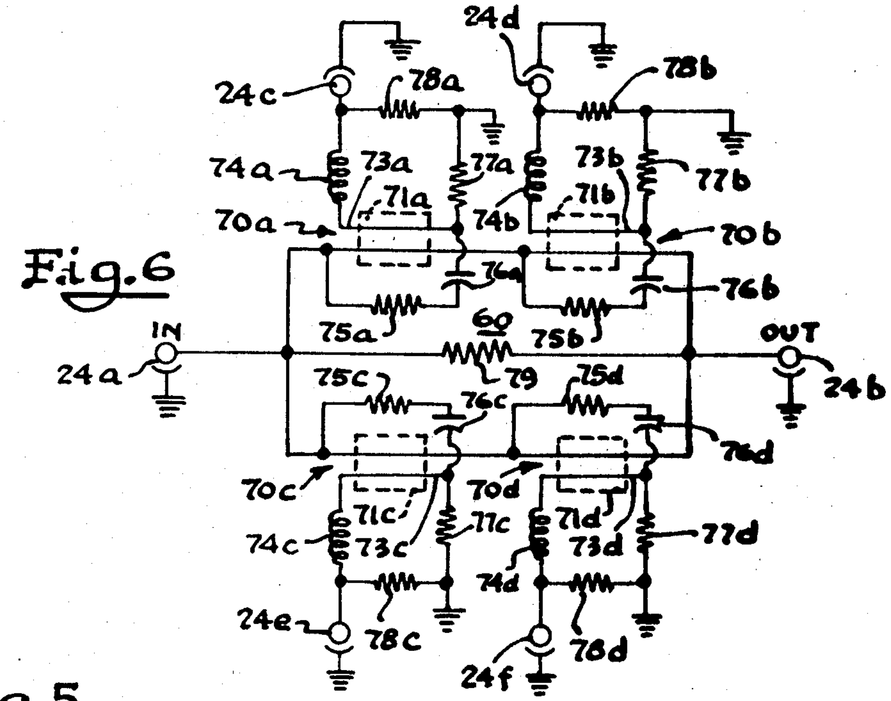
FIG. 6 is a schematic diagram of the circuitry for a directional line drop trap unit in accordance with the present invention for coupling four television receiver sets to the main trunk line.
Figure 5:
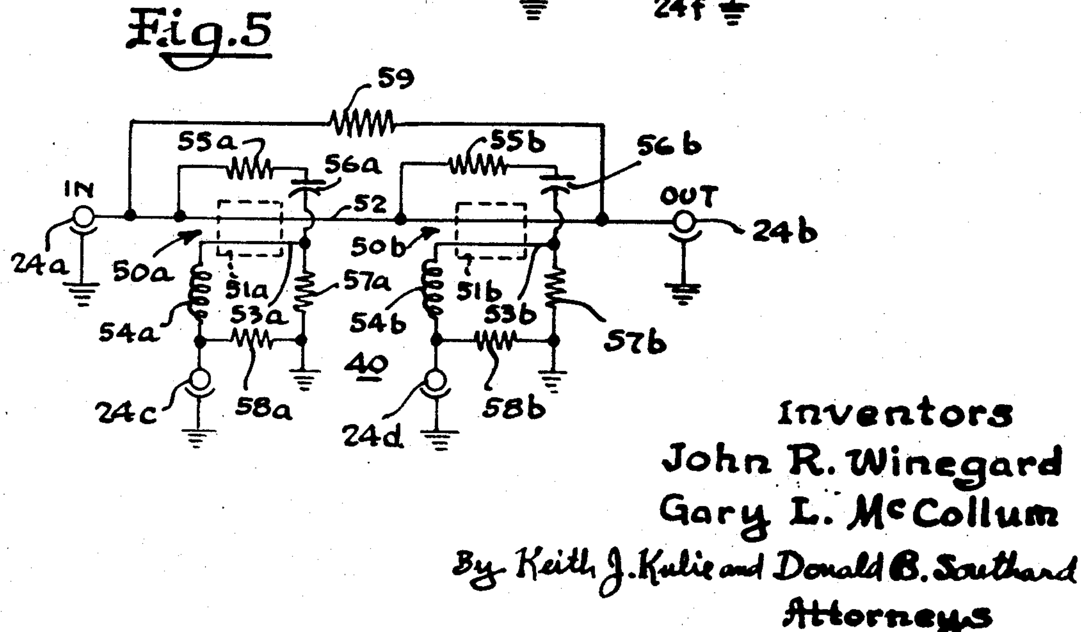
FIG. 5 is a schematic diagram of the circuitry for a directional coupler unit in accordance with the present invention for coupling two television receiver sets to the main trunk line.

The above described embodiment relates to a coupler unit 20 which has a single output for connection to a single associated television receiver. There are of course applications in which additional outputs may be desired for other associated television receivers. FIG. 5 illustrates the schematic diagram for another embodiment of the present invention in which a directional coupler unit may accommodate two television receivers. In FIG. 6, a schematic diagram is illustrated for still another directional coupler unit which may accommodate up to four television receivers.

In FIG. 5, a directional coupler unit 40 is shown having an input connector jack 24*a* for connection to the input, or television antenna, side of the main trunk line TL and an output connector jack 24*b* for connection to the down or terminal side of the trunk line TL. Receiver output jacks 24*c* and 24*d* are provided for connection to two associated television receivers. In this embodiment, a one-turn transformer 50*a* is provided as well as a similar transformer 50*b*. The single wire conductor 52 forms the primary for both transformers 50*a* and 50*b*, passing through cylindrical cores 51*a* and 51*b*, respectively, formed of a suitable ferrite material. The secondary of transformer 50*a* is formed by the single wire conductor

53*a*, passing through the core 51*a*, and the secondary of the transformer 50*b* is formed by the conductor 53*b*, passing through the core 51*b*. An inductance 54*a* is connected between one side of the secondary 53*a* and the inner conductor of the connector jack 24*c*. A resistor 58*a* is connected between the inner conductor of the connector jack 24*c* and ground. Another resistor 57*a* is connected between the other end of the secondary 53*a*, remote from inductance 54*a*, and ground. A resistor 55*a* and capacitor 56*a* are serially connected from the input side of the primary 52 and junction of the secondary 53*a* and the resistor 57*a*. Similarly, an inductance 54*b* is connected between one side of the secondary 53*b* and the inner conductor of the connector jack 24*d*. A resistor 58*b* is connected between the inner conductor of the connector jack 24*d* and ground. Another resistor 57*b* is connected between the other end of the secondary 53*b*, remote from the inductance 54*b*, and ground. A resistor 55*b* and capacitor 56*b* are serially connected from the input side of the primary 52 and the junction of the secondary 53*b* and the resistor 57*b*. Finally, a resistance 59 is connected in parallel with the conductor 52 forming a signal path in shunt with the transformers 50*a* and 50*b*.

It is to be understood that all of the component parts in the embodiment of FIG. 5 have the same value as the corresponding component parts as shown in the embodiment of FIGS. 2, 3 and 4, with the exception of the resistor 59. In the embodiment of FIG. 5, the resistor 59 has a value of approximately 28 ohms whereas the resistor 39 of FIGS. 2–4 has a value of approximately 15 ohms. In addition, the embodiment of FIG. 5 in operation will function in the same way as the embodiment as illustrated in FIGS. 2–4 with the exception that the former may accommodate two television receivers instead of just one. Comparable isolation figures, both forward and backward, as well as VSWR are obtained. That is, in excess of 40 db of isolation is maintained for signals reflected back up the main trunk line TL, with approximately 20 db of isolation in the forward direction, or through coupler unit 40. VSWR of 1.1:1 to 1.4:1 is realized in the forward direction and a flat VSWR of approximately 1.25:1 in the reverse, or backmatch direction. In addition, an unused outlet (either 24*c* or 24*d*) need not be terminated and substantially infinite isolation is exhibited between the receiver outlets 24*c* and 24*d*. Insertion loss varies between −1.5 db at approximately 50 mHz. to −3.3 db at approximately 890 mHz.

In the embodiment of FIG. 6, a coupler unit 60 is provided that will accommodate up to four television receiver sets. In this embodiment, component parts with like functions are given the same numerical symbol in combination with a differing subscript letter. For example, the transformers are identified at 70*a*, 70*b*, 70*c* and 70*d*. The ferrite cores are identified at 71*a* through 71*d*. The secondaries of the transformers 70*a* through 70*d* are identified at 73*a* through 73*d*, respectively. Terminating resistances are identified at 77*a* to 77*d* and 78*a* to 78*d*. Compensating inductances are identified at 74*a* to 74*d*. Alternate signal paths to the respective secondaries are indicated by the resistor-capacitor combinations identified at 75*a*–76*a* to 75*d*–76*d*, respectively. A single shunt resistance 79 is provided between the input connector jack 24*a* and the output connector jack 24*b*. The receiver output connector jacks are identified at 24*c*, 24*d*, 24*e* and 24*f*.

It will of course be understood that the operation of the embodiment of FIG. 6 is essentially the same as previously described for the embodiment as shown in FIGS. 2, 3 and 4 and for the embodiemnt as shown in FIG. 5, with the exception that the former will accommodate up to four television receiver sets. Substantially the same performance characteristics are obtained as previously set forth.

The following values for the identified component parts have been found to provide satisfactory operation in the coupler units embodying the present invention:

| | |
|---|---|
| Resistors: | |
| 35, 55*a*–55*b*, 75*a*–75*d* | 1000 ohms. |
| 37, 57*a*–57*b*, 77*a*–77*d* | 150 ohms. |
| 38, 58*a*–58*b*, 78*a*–78*d* | 100 ohms. |
| 39, 79 | 15 ohms. |
| 59 | 28 ohms. |
| Capacitors 36, 56*a*–56*b*, 76*a*–76*d* | 8 picofarads. |
| Inductance 34, 54*a*–54*b*, 74*a*–74*d* | 6 turns of approximately 22 gage wire on 3/16 inch air core. |
| Conductors 32, 52, 72 | Solid, enameled wire of approximately 18 gage. |
| Conductors 33, 53*a*–53*b*, 73*a*–73*d* | Solid, enameled wire of approximately 22 gage. |
| Conductor 26 | Approximately 1/4 inch flat metallic ribbon. |
| Ferrite cores 31, 51*a*–51*b*, 71*a*–71*d* | Cylindrical core with approximately 1/4 inch O.D. |

While only certain embodiments of the present invention have been shown and described herein, it will, of course be realized that still other embodiments, modifications and alternatives in construction will occur to practioners of the art without departing from the true scope and spirit of the present invention. It is intended that all such alternatives, modifications and embodiments within the true scope and spirit of the present invention to come within the scope of the appended claims.

What is claimed is:

1. A subminiaturized directional coupler unit for coupling a receiver device to a distribution line on which signal energy is transmitted therealong in the frequency range from 50 mHz. to 1000 mHz., comprising in combination:

means for connecting said coupler unit in series with the distribution line intermediate its length;

means for coupling a portion of the signal energy travelling down the distribution line in the forward direction to the receiver and for effecting a high degree of isolation for any such signal energy reflected back up the distribution line in the reverse direction;

said last mentioned means including a transformer having a single-turn primary in series with the distribution line and a single-turn secondary coupled to the receiver, and circuit means connected between one side of said transformer primary and the opposite side of said secondary, said circuit means coupling an additional portion of signal energy present on the distribution line to said transformer secondary which aids and is additive to said portion of signal energy coupled to said secondary by transformer action for signals traveling down the distribution line in the forward direction and opposing any such signal energy coupled to said secondary by transformer action for signals reflected back up the distribution line in the backward direction;

said transformer having means for effecting substantially a precise impedance match in the forward diiection;

resistance means coupled to respective ends of said transformer secondary for providing substantially a precise impedance match in the backward direction from the receiver through the coupler unit; and impedance means coupled to said transformer secondary for effecting substantially uniform response by the coupler unit over the entire operating frequency range.

2. A directional coupler unit in accordance with claim 1 wherein said transformer includes a cylindrical core of ferrite material and wherein the transformer primary and secondary comprise a single wire conductor, respectively, passing through said ferrite core.

3. A directional coupler in accordance with claim 1 wherein said impedance means for effecting uniform response across the operating frequency range includes an inductance connected between said transformer secondary and the receiver which selectively exhibits a higher impedance with respect to an increase in operating frequency so as to effectively offset the increase in the efficiency of said transformer with respect to higher frequencies.

4. A directional coupler unit in accordance with claim 1 wherein the means for connecting the coupler unit in series with the distribution line includes a single conductor interconnected between the inner conductors of segments of the distribution line and wherein the impedance matching means for effecting an impedance match in the forward direction through said coupler unit includes a flat metallic strip maintained at a reference potential and which strip is positioned in a closely spaced, parallel relaton to said single conductor to form an open wire transmission line having an impedance which matches the characteristic impedance of the distribution line.

5. A directional coupler unit in accordance with claim 1 wherein said circuit means includes a resistance and capactiance connected in series between said one side of said transformer primary and said opposing side of said transformer secondary, which resistance being approximately ten times the nominal characteristic impedance of the distribution line.

References Cited

UNITED STATES PATENTS

| | | | |
|---|---|---|---|
| 2,734,169 | 2/1956 | Douma | 333—10 X |
| 2,972,121 | 2/1961 | Firestone | 333—10 |
| 3,048,798 | 8/1962 | Simons | 333—10 |
| 3,349,345 | 10/1967 | Winegard | 333—8 |
| 3,440,571 | 4/1969 | Simons | 333—10 |

PAUL L. GENSLER, Primary Examiner

U.S. Cl. X.R.

325—308; 333—8